United States Patent Office 3,415,778
Patented Dec. 10, 1968

3,415,778
MODIFIED ORGANOPOLYSILOXANES AND
PREPARATION THEREOF
Alfred J. Burzynski and Robert E. Martin, Toledo, Ohio,
assignors to Owens-Illinois, Inc., a corporation of Ohio
No Drawing. Continuation of application Ser. No.
419,216, Dec. 17, 1964. This application Feb. 5,
1968, Ser. No. 703,182
15 Claims. (Cl. 260—46.5)

ABSTRACT OF THE DISCLOSURE

Organopolysiloxanes, especially those produced from trifunctional silanes such as the trialkoxysilanes, are modified by incorporating into the organopolysiloxane molecule boron compounds that either contain or are capable of forming B—OH linkages in the aforesaid molecule. Examples of such compounds are the oxides, acids and hydrolyzable esters of boron. The products are useful as machinable casting resins and as film-forming material in coating applications.

---

This application is a continuation of Ser. No. 419,216, filed Dec. 17, 1964, now abandoned.

This invention relates broadly to compositions comprising a modified organopolysiloxane and, more particularly, to organopolysiloxanes modified with (i.e., having incorporated therein) a compound of boron having or capable of forming B—OH linkages, e.g., during incorporation into the unmodified organopolysiloxane (or precursor or precursors thereof), if the boron compound does not initially contain B—OH linkages. The scope of the invention also includes method features.

In one preferred embodiment of the invention the organopolysiloxane comprises or consists essentially of the siloxane condensation product of hydrolyzable silane including at least one compound represented by the general formula I  $T_nSiZ_{(4-n)}$ wherein each T independently represents a member of the group consisting of alkyl, alkenyl and aryl radicals having less than 7 carbon atoms, each Z independently represents a hydrolyzable group, and $n$ represents a positive integer less than 4.

It will be understood, of course, by those skilled in the art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the cohydrolysis and cocondensation products that result when mixtures of silicon-containing starting reactants are employed.

The present invention is an improvement in the solid, machinable, thermoset organopolysiloxane resins or structures disclosed and claimed in our copending application Ser. No. 306,344, and now abandoned and in the compositions disclosed and claimed in our copending application Ser. No. 370,684, now abandoned including method features. Both of these applications are assigned to the same assignee as the instant invention, and by this cross-reference are made a part of the disclosure of the present invention. For purpose of brevity, the aforementioned copending applications will sometimes be referred to hereinafter as the -344 and -684 applications.

For certain uses the solid, machinable, thermoset or cured organopolysiloxanes produced as described in our aforementioned -344 and -684 applications do not have the optimum physical properties, e.g., clarity, optimum thermal stability for a maximum period of time, optimum resistance to thermal shock on cooling, optimum external and/or internal hardness, and optimum solvent resistance necessary to meet the requirements of the particular service application.

The present invention is based on our discovery that the aforementioned physical properties of the organopolysiloxanes of the -344 and -684 applications can be improved in such properties as mentioned in the preceding paragraph by incorporating therein a compound of boron having or capable of forming B—OH linkages, e.g., a hydrolyzable (including cohydrolyzable) oxygen-containing boron compound. Also, the addition of the boron compound tends to increase the time necessary for the formation of a single-phase system which, in turn, probably decreases the degree of cross-linking that takes place.

The aforementioned boron compounds may be collectively termed "B—OH formable" boron compounds since B—OH linkages are actual or latent therein. They also may be defined more specifically as an oxygen-containing compound of boron. Examples of such boron compounds are the two known forms of boron oxide, $B_2O_3$; a boric acid, e.g., ortho-boric acid, $H_3BO_3$, and tetra- or pyroboric acid, $H_2B_4O_7$; and the hydrolyzable boric esters (mono-, di- and triesters). Advantageously the hydrolyzable boric ester, if used, is one represented by the general formula II 

wherein R represents an alkyl radical (normal or isomeric forms) containing less than 6 carbon atoms that may be the same or different, and which is preferably an alkyl radical containing less than 5, more particularly less than 4, carbon atoms that may be the same or different. Instead of using a single boron compound of the kind mentioned above one may use, if desired, a mixture of such boron compounds in any proportions.

It is a primary object of the present invention to provide new and useful modified organo-silicon compounds and, more particularly, modified organopolysiloxanes.

It is a further object of the instant invention to provide modified organopolysiloxanes having improved physical properties, such as improved hardness, as compared with unmodified organopolysiloxanes which are otherwise the same.

Another object of the invention is to provide a method of preparing the aforementioned modified organopolysiloxanes.

Still other objects of the invention will be apparent to those skilled in the art from the following more detailed description and from the appended claims.

The foregoing objects of the invention are attained by producing a boron-modified organopolysiloxane as described briefly hereinbefore and more fully hereafter.

In accordance with one embodiment of the present invention there is first prepared an organopolysiloxane comprising or consisting essentially of the siloxane condensation product of the hydrolysis product of hydrolyzable silane including at least one compound embraced by Formula I.

Illustrative examples of groups represented by Z in Formula I include, for example, halogen (chlorine, bromine, fluorine and iodine), alkoxy (e.g., methoxy through heptoxy), and acyloxy (e.g., acetoxy, propionoxy, butyroxy, pentanoxy, hexanoxy, etc.), and aryloxy, e.g., phenoxy. In particular, alkoxy groups are preferred because their hydrolysis products are less acidic, and therefore control of the rate of siloxane condensation is simpler. Alkoxy groups of less than 5 carbon atoms are especially advantageous (and are preferred) for the radical represented by Z in Formula I, because the rate of hydrolysis can be inconveniently slow when the organic hydrolyzable radical(s) have a higher molecular weight (i.e., more carbon atoms).

Illustrative examples of radicals represented by T in Formula I are alkyl, e.g., methyl and propyl through hexyl (both normal and isomeric forms), cyclopentyl, cyclohexyl, vinyl and the normal and isomeric forms of propenyl through hexenyl, and phenyl.

More specific examples of compounds embraced by Formula I are given hereinafter with respect to compounds within the scope of Formulas III and IV given later herein.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid or base, use of an added solvent, are used. Viscosity of the final product can be regulated by controlling the time of reaction, use of catalysts, concentration of reactants, rate of evaporation, and similar variables. The particular manner in which control of these variables will be attained will depend on the particular circumstances, and can be determined by routine experimentation according to procedures generally well known to those skilled in the art.

Preparation of unmodified organopolysiloxanes

In general, the preparation of the unmodified organopolysiloxane comprises heating a hydrolyzable silane including at least one compound embraced by Formula I with from 1.5 to 10 moles of water for each mole of the total molar amount of the hydrolyzable silane(s). Heating is continued for at least one hour and up to about 10 hours or more at a temperature of at least about 50° C. while retaining at least about 1.5 moles of hydroxy-containing by-products in the reaction mass per mole of silicon-containing starting material, assuming complete hydrolysis of all the hydroxyhydrocarbyl-silicon linkages in the said reaction mass. Thereafter the temperature of the reaction mass is gradually raised to a final temperature of from about 100° C. to about 300° C. while gradually removing by volatilization the volatile by-products, e.g., alkanol by-products and some water. This occurs over a time interval of at least 5 minutes. Thereafter, condensation and heating are continued in the aforesaid temperature range of from 100°–300° C. for a period short of gel or solid formation within the said temperature range.

Suitable experimentally-determined variations of the time and temperature parameters of the process involved in making the organopolysiloxanes would probably allow use of, for example, alkoxysilanes containing a higher number of carbon atoms in an alkoxy chain. However, in general, the longer hydrolysis time required by alkoxy radicals of longer chain-length makes them, ordinarily, undesirable for use.

As has been indicated hereinbefore, the concentration of water in the initial hydrolysis-condensation reaction mixture advantageously is at least about 1.5 moles, more particularly from about 1.5 moles to about 10 moles of water, per mole of the total amount of hydrolyzable silane reactant(s). Organopolysiloxane resins can be prepared at the aforementioned lower concentration of water, but further decrease in the water content of the reaction mass ordinarily leads to the production of polymers that are rubbery and soft, presumably due to incomplete hydrolysis and condensation. If the quantity of water is in the range of from about 1.5 moles to about 5 moles of water per mole of the hydrolyzable silane(s), the hydroxy-containing by-products, e.g., alkanols, formed during hydrolysis, act as a solvent for the other products and reactants, as a result of which the initially heterogeneous reaction mass becomes clear and homogeneous. This homogeneity is desirable, since it prevents resin precipitation and allows more uniform control of resin formation.

If the ratio of water to hydrolyzable silane(s) substantially exceeds 5:1, the resulting amount of by-product hydrolysis products, such as alkanols or phenol, is insufficient to convert the aqueous medium to a solvent for the reactants and the reaction products, and resin precipitation can occur. Insolubility of resinous products at higher water concentrations can be overcome by adding a water-miscible organic solvent, e.g., ethanol, isopropanol, or any other organic solvent for the polymer having water-miscibility characteristics. However, at water-concentrations above about 10 moles of water per mole of hydrolyzable silicon-containing monomer, gel formation may occur even if sufficient organic solvent is added to make the reaction mass homogeneous. The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz., from about 1.5 moles to about 5.0 moles of water per mole of hydrolyzable silicon-containing monomer, are preferred.

At pressures near one atmosphere, temperatures in the range of from about 50° C. to the reflux temperature of the reaction mass are useful. Temperatures much below this range require substantially longer times for reaction, and thus obviate a particularly advantageous aspect of the resin-making process, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 3 hours.

It is preferred that some of the hydrolysis by-products, such as alkanols, be retained in the reaction mass during the initial hydrolysis and condensation. It is believed that the presence of such hydroxy-containing by-products slows, by mass action, the overall rate of hydrolysis-condensation. This control of the rate of resin formation prevents gel formation and makes possible the preparation of homogeneous, boron-modified, highly cross-linked polymers having good dimensional stability. If the concentration of hydrolysis by-products is allowed to fall substantially below 1.5 moles thereof per mole of the hydrolyzable silicon-containing monomeric material (assuming that complete hydrolysis takes place), gel formation occurs. This limit can vary slightly with the particular materials and conditions employed.

After initial hydrolysis and condensation under the conditions just described, controlled volatilization of the hydrolysis by-products, e.g., alkanols and water, is effected while the reaction mass is heated to from about 100° C. to about 300° C. This relatively high (i.e., above 100°

C.) temperature step is herein designated as the "precure" step.

The purpose of precure is to effect controlled removal of volatiles while the siloxane condensation reaction continues at a convenient rate, but which is nevertheless slowly enough to avoid gel formation. In general, the highest possible precure temperature is preferred, since this provides greatest impetus to siloxane formation and volatilization of the hydrolysis by-products, and makes possible the shortest time required to effect final cure at a lower temperature.

The temperature to which a particular reaction mass can be heated during precure without causing gelation thereof depends, for example, upon the particular materials used and their prior treatment, but the limit can be readily established by heating an aliquot to gelation and keeping the precure temperature of the main batch slightly below this gelation point. The precure time is similarly dependent upon several variables. At a precure temperature above 100° C. it is, in general, at least about 5 minutes, although the time at the highest temperatures attained can be merely momentary.

To avoid gelation and to effect polysiloxane formation at a conveniently rapid rate, the acidity of the initial hydrolysis-condensation reaction mass advantageously is maintained within certain limits hereinafter set forth in detail. Commercial hydrolyzable silicon-containing compounds (silanes) of the kind embraced by Formula I, such as commercial alkoxysilanes, usually contain a quantity of acid or base that exceeds the relatively narrow limits permissible in the initial reaction mixture employed in practicing a preferred embodiment of the instant invention. Impure monomers can be used in the hydrolysis reaction mixture, followed by addition of acid or base to adjust the pH to the required level. However, the large amount of salts that are formed impair desirable properties, especially transparency, of the final products. Salts, particularly those of variable-valence cations, may also act as catalysts for siloxane formation. It is, therefore, preferable to adjust the pH of the monomer or mixture of monomers before preparing the reaction mixture. Simple distillation is unsuitable because it increases the acidity of the monomeric material, probably by oxidation of some organic groups to acidic or potentially acidic functions such as carboxylic acids, esters, aldehydes and/or ketones. Use of a nitrogen atmosphere is insufficient to prevent this acidity increase, apparently because the system itself contains oxidizing species. Reduction of acid content can be carried out by adding bases such as metal hydroxides or amines, but the salts that are formed are objectionable impurities in the final products.

A preferred technique for preparing the monomeric material is by distillation of an admixture of the monomer with a reagent that will convert acidic species therein to nonvolatile compounds, for instance as disclosed in our aforementioned copending application Ser. No. 370,684.

Initial hydrolysis-condensation is conveniently carried out by charging to a reaction vessel pure water, a hydrolyzable silane of the kind embraced by Formula I, and preferably also a small amount of an acidic catalyst. The initially cloudy reaction mixture clears on heating, usually within an hour, because the hydroxyhydrocarbon by-product, specifically alcohol, dissolves the other components of the mixture. A suitable degree of hydrolysis-condensation is usually obtained if reflux is allowed to proceed for from about 1 to 4 hours after the mixture clears. This step can be carried out at lower temperatures, but the rate is substantially slower.

The upper limit of permissible acid content during this initial hydrolysis-condensation is that beyond which gel formation occurs. The lower limit is determined by the desired reaction time. In general, the minimum reaction time to obtain satisfactory products is usually about 1 hour under reflux. Maximum and minimum allowable acid contents vary with the ratio of hydrolyzable silane(s) and water used. The lower theoretical water content is $Z/2$, where $Z$ is the average number of hydrolyzable groups attached to silicon throughout the reaction mass. Thus when the hydrolyzable silane is, for example, a methyltrialkoxysilane as the sole silane constituent, the theoretical lower molar ratio of hydrolyzable silane:water is 1:1.5. At this molar ratio, the acid content is generally controlled within the range of from about 50 to about 650 parts (or higher in some cases) of HCl per million parts of hydrolyzable silane. When the hydrolyzable silane:water molar ratio is 1:3.0, the minimum acid content is about 1 part of HCl per million parts of the hydrolyzable silane and the maximum is about 10 parts on this same basis.

The aforementioned limits are necessarily subject to minor variation in each case. First, polymer formation by its nature will not proceed identically in any two runs, and the particular mode of polymerization can alter slightly the acid sensitivity of the system. Second, use of other hydrolyzable silanes in certain amounts as comonomers can reduce acid sensitivity, but the effect will generally be small. Third, extremely small quantities of impurities in a given sample, impractical to remove, can alter acid sensitivity slightly. These factors, however, affect only the maximal and minimal extremes of acid content, and the major portion of the suitable area indicated will be unchanged.

It is usually most convenient to reduce the acid content of the monomer(s) to about zero part by weight of HCl per million parts of monomer(s) by suitable acid-removal technique and, if necessary, then adjust the acidity of the initial reaction mixture by adding acid to the water used. Although generally any acidic material soluble in the reaction mass can be used, organic acids such as phenol and formic acid are particularly suitable because they retard subsequent oxidation of the reactants.

The reaction mass obtained from the initial hydrolysis-condensation reaction is concentrated by removing volatile components, conveniently by distillation from the vessel containing the said mass. All of the solvents should not be removed or the resin will have a pronounced tendency to gel. Usually, removal of about 80 mole percent of the hydroxyhydrocarbon by-product, e.g., an alkanol, gives a residue convenient to manipulate further by the particular means herein described. The concentrate thus obtained is next heated to a temperature above the boiling point of pure water at the prevailing pressure for a specified time, conveniently while stirring in an open vessel. The time and temperature of this precure step are determined by the particular composition used, but in general a temperature of 110° to 300° C. at ambient pressure and a period up to about 30 minutes are typical. The elimination of water and other volatile materials from the reaction mass at this point presumably leads to further linear polymerization and cross-linking, and the mass becomes increasingly viscous.

If the precure step is omitted from the process, the resins cast from the liquid, boron-modified organopolysiloxane crack severely during the final curing step. Such cracked resins can be pulverized, e.g., to 300-mesh particle size and finer, and the finely divided resin used as a filler in paints and molding compositions (e.g., urea- and melamine-formaldehyde resins, methyl methacrylate and other acrylate polymers, polystyrene, etc.), and in making other filled compositions and articles from any of the available unfilled or partly filled natural resins, thermoplastic and thermosetting resins and plastics, and the like.

Production of solid, machinable, resins or structures

As has been indicated hereinbefore, the present invention can be practiced by modifying the solid, machinable, thermosetting (or thermoset) organopolysiloxane resins or structures disclosed and claimed in our aforementioned copending applications Ser. Nos. 306,344 and 370,684.

The invention of our application Ser. No. 370,684 is directed to a method of preparing a solid resin by (a) heating reactant(s) consisting of a methyltrialkoxysilane of the formula III

and 0 to 10 mole percent, preferably not more than 5 mole percent, based on total silane reactant(s), of at least one compound of the formula IV

wherein each T independently represents a monovalent radical selected from the group consisting of aryl, alkyl (including cycloalkyl), and alkenyl radicals, each of which contains less than 7 carbon atoms, and the alkoxy radical, RO—, wherein R represents an alkyl radical of less than 4 carbon atoms, and from 1.5 to 10 moles of water per mole of silane, for at least one hour and up to 10 hours at temperatures of at least 50° C. while retaining at least 1.5 moles of alkanol by-products in said mixture per mole of silane starting material assuming complete hydrolysis of all alkoxy-silicon linkages in said mixture, and (b) gradually raising the temperature of the resulting mixture to a final temperature of from 100° to 300° C. while gradually removing by volatilization alkanol by-products and some water, over a time interval of at least 5 minutes, and continuing condensation and heating in the range of 100° to 300° C. for a time short of solid or gel formation in said temperature range.

Methyltrialkoxysilanes used in practicing the invention of the aforementioned Ser. No. 370,684 are those of the formula $CH_3Si(OR)_3$ where each R represents an alkyl radical with less than 4 (i.e., 1 to 3) carbon atoms. Included are methyltrimethoxysilane, methyltriethoxysilane, methyltri-n-propoxysilane, and methyltriisopropoxysilane, as well as compounds with mixed alkoxy groups. Examples of coreactants embraced by Formula IV (and also by Formula I, supra) include trimethylmethoxysilane, tri(1 - methylethyl)ethoxysilane, di(1 - methylpropyl)diethoxysilane, divinyldipropoxysilane, diphenyldiethoxysilane, propylpentylmethoxyethoxysilane, methylallyldi(1 - methylethoxy)silane, vinylphenyldimethoxysilane, ethyltriethoxysilane, (1 - methylethyl)trimethoxysilane, (1,1 - dimethylethyl)tripropoxysilane, hexyltriethoxysilane, and vinyltriethoxysilane.

Comonomers embraced by Formula I and also by Formula IV, if employed, can be used to modify the properties of the resins according to principles known generally to the art. Thus, comonomers containing 3 or 4 alkoxy groups act as cross-linking agents; those with 2 alkoxy groups act to increase chain length and decrease cross-linking; and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers substantially above this amount may cause decreased chemical resistance.

In this embodiment, too, the concentration of water in the initial hydrolysis-condensation reaction mixture should be in the range of from about 1.5 moles to about 10 moles of water per mole of silane reactants. Likewise, the other remarks made hereinbefore with respect to resin precipitation and avoidance thereof apply to the production of a solid, machinable polysiloxane, as do also the remarks made with regard to the temperature and pressure of the reaction, and the retention of hydrolysis products (e.g., an alkanol) in the reaction mass during hydrolysis and initial condensation.

Initial hydrolysis-condensation is conveniently carried out by placing in a flask pure water, methyltrialkoxysilane, the acid content of which has been suitably adjusted, and from 0 to 10 mole percent, preferably not more than 5 mole percent, based on the total hydrolyzable silanes, of a compound of the kind embraced by Formula IV. If desired or deemed necessary, these compounds may be purified. The resulting mixture is then heated under reflux conditions.

The initially cloudy reaction mixture clears on heating, usually within an hour, because the hydroxyhydrocarbon by-product, specifically alcohol, dissolves the other components of the mixture. As previously has been stated, a suitable degree of hydrolysis-condensation is usually obtained if reflux is allowed to proceed for from about 1 to 4 hours after the mixture clears.

Other conditions with respect to the permissible acid content during the initial hydrolysis-concentration step, and concerning other influencing variables have been given hereinbefore.

In making methylpolysiloxanes referred to above, as well as, for instance, (methyl)(phenyl)polysiloxanes, some alkanol or other hydrolysis by-product should be retained, as previously indicated, in the reaction mass during hydrolysis and initial condensation for the reasons previously given. To avoid gelation and effect polysiloxane formation at a conveniently rapid rate, the acidity of the initial hydrolysis-condensation reaction mixture advantageously is suitably controlled. After initial hydrolysis and condensation controlled volatilization of hydrolysis by-products and water is effected, while the temperature of the mixture is raised to temperatures in the range of 100° to 300° C., thereby to precure the resin in the manner and for the reasons previously stated.

Other techniques for preparing an organopolysiloxane which is modified with a boron compound Other technique, including both composition and method features, for preparing an organopolysiloxane that advantageously can be modified with a boron compound in accordance with the present invention is described in our aforementioned copending application Ser. No. 306,344. In the invention of this application, a mixture which comprises a precursor hydrolyzable to methylsilanetriol, a precursor hydrolyzable to phenylsilanetriol, and water is heated; the reaction mixture is concentrated by removing a substantial portion but not all of the volatile components; heated above the boiling point of pure water at the prevailing pressure; and formed and heated at a temperature below the boiling point of pure water at the prevailing pressure to provide a cured, machinable, heat-resistant organopolysiloxane body.

In the procedure of the invention of the —344 application usually a mixture which comprises a hydrolyzable methyltrialkoxysilane, a hydrolyzable phenyltrialkoxysilane, and water in a relative molar ratio of $x:y$:at least 1.5 $(x+y)$, respectively, wherein $x$ and $y$ are independently selected from the range of 1 to 10 inclusive, is heated at a temperature between ambient temperature and reflux temperature for a time of 1 to 10 hours; 50 to 90 mole percent of the alkanol by-product is removed by volatilization, the boron compound advantageously being added before or during the removal of this mole percent of alkanol by-product; the reaction mixture is heated to effect precure at a temperature within the range of up to 100 centigrade degrees above the boiling point of pure water at the prevailing pressure for a time up to 30 minutes; and the resinous mixture thus obtained is formed, usually by casting, and then cured for a time of at least 1 hour and up to 30 days at a temperature of from 1 centigrade degree to 60 centigrade degrees below the boiling point of pure water at the prevailing pressure to give a cured or hardened, machinable, heat-resistant organopolysiloxane body.

The methyltrialkoxysilanes and phenyltrialkoxysilanes cited in the preceding paragraph refer to compounds of the formula $CH_3Si(OR)_3$ and $C_6H_5Si(OR)_3$, wherein R represents a monovalent alkyl radical of less than five (i.e., 1–4) carbon atoms. Examples of such methyltrialkoxysilanes are methyltrimethoxysilane, methyltriethoxysilane, methyltri(1-propoxy)silane, methyltri(2-propoxy) silane, methyltri(2 - methyl-2-propoxy)silane, methyltri (1 - butoxy)silane, and methyltri(2 - butoxy)silane; examples of phenyltrialkoxysilanes are phenyltrimethoxysilane, phenyltriethoxysilane, phenyltri(1-propoxy)silane, phenyltri(2 - propoxy)silane, phenyltri(2 - methyl-2-propoxy)silane, phenyltri(1 - butoxy)silane, and phenyltri (2-butoxy)silane.

A further aspect of the invention of the —344 application that provides an especially heat-resistant, machinable, cured organopolysiloxane body comprises heating a mixture which comprises a hydrolyzable methyltrialkoxysilane, a hydrolyzable phenyltrialkoxysilane, and water in a relative molar ratio of $x:y$:at least 1.5 $(x+y)$ respectively, and advantageously a ratio of $x:y:3(x+y)$, respectively, wherein $x$ and $y$ are independently selected from the range of 1 to 10, inclusive, at a temperature between ambient temperature and 150° C. for a time of 1 to 10 hours; removing 50 to 90 mole percent of the alkanol by-product by volatilization; heating the reaction mixture to effect precure at a temperature within the range of from 5 centigrade degrees up to 110 centigrade degrees above the boiling point of pure water at the prevailing pressure, but usually not above 250° C., for a time up to 30 minutes; casting and then curing the resinous mixture thus obtained for at least one day at a temperature within 10 centigrade degrees below the boiling point of pure water at the prevailing pressure, then at a temperature increasing continually up to a maximum of up to 350° C. over a period of from 2 to 30 days, and finally allowing the sample to return slowly to ambient temperature over a time of from 1 to 12 hours.

A preferred procedure of the invention of the —344 application comprises heating at reflux temperature, for from 2 to 4 hours, a reaction mixture which comprises methyltriethoxysilane, phenyltriethoxysilane, and water in a relative molar ratio of $x:y$:at least $1.5(x+y)$, respectively, and advantageously a ratio of $x:y:3(x+y)$, respectively; in other words, on a molar basis the ratio of water to the sum of $x+y$ is a minimum of 1.5 and advantageously is 3. The values $x$ and $y$ are independently selected from the range of 1 to 5, inclusive. Additional steps in the preferred procedure include distilling 70 to 80 mole percent of 95% ethanol by-product from the reaction mixture, subjecting the distillation residue to a precure at 110° to 200° C. for a time up to 10 minutes at ambient pressure; and finally casting and then curing the resulting resinous mixture at 25° to 95° C. and at about atmospheric pressure for a time of from one day to one week to give a machinable, cured, heat-resistant organopolysiloxane body.

The initial reaction mixture of the procedure of the —344 application optionally contains an acidic catalyst, although the hydrolysis and subsequent condensation normally proceed at a convenient rate without them. To avoid premature gelation of the resins the quantity of acid in the reaction mixture must be below 0.01 mole of acid per mole of hydrolyzable precursor of a silanol. Similarly a solvent, e.g., ethanol, can be added to render the reaction mixture homogeneous.

The initial reaction mixture used in the invention of the —344 application also may contain precursors of methylsilanetriol and phenylsilanetriol in the above-defined ratios and 0 to 10 mole percent, usually 0 to 5 mole percent, of a coreactant which, when present, usually comprises at least 1 mole percent of the mixture. (The aforementioned mole percentages are based on the hydrolyzable silane components of the initial mixture.)

The aforesaid coreactant comprises at least one compound of the formula

V 

wherein $Z^1$, $Z^2$ and $Z^3$ represent monovalent hydrocarbon radicals independently selected from the group consisting of aryl, alkyl (including cycloalkyl) and alkenyl radicals, each of which contains less than 7 (i.e., 1–6) carbon atoms, and the hydroxyl radical. Examples of such coreactants are trimethylsilanol,
tri(1-methylethyl)silanol,
trihexylsilanol,
di(1-methylpropyl)silanediol,
divinylsilanediol,
diphenylsilanediol,
propylpentylsilanediol,
methylallylsilanediol,
vinylphenylsilanediol,
ethylsilanetriol,
1-methylethylsilanetriol,
1,1-dimethylethylsilanetriol,
2,2-dimethylpropylsilanetriol,
hexylsilanetriol, and
vinylsilanetriol.

These coreactants can be added to the reaction mixture in the form of their precursors of the formula VI 

wherein $T^1$, $T^2$ and $T^3$ represent monovalent hydrocarbon radicals independently selected from the group consisting of aryl, alkyl (including cycloalkyl) and alkenyl radicals, each of which contains less than 7 carbons atoms, and the alkoxy radical RO—, wherein R has the meaning previously defined with respect to the formulas for $CH_3Si(OR)_3$ and $C_6H_5Si(OR)_3$. Examples of such precursors are trimethylmethoxysilane,
tri(1-methylethyl)ethoxysilane,
di(1-methylpropyl)diethoxysilane,
divinyldipropoxysilane,
trihexyl(1,1-dimethylethoxy)silane,
tricyclopentylmethoxysilane,
diphenyldiethoxysilane,
propylpentylmethoxyethoxysilane,
methylallyldi(1-methylethoxy)silane,
vinylphenyldimethoxysilane,
ethyltriethoxysilane,
(1-methylethyl)trimethoxysilane,
(1,1-dimethylethyl)tripropoxysilane,
(2,2-dimethylpropyl)tributoxysilane,
hexyltriethoxysilane, and
vinyltriethoxysilane.

A further variation in the procedure of the invention of the —344 application can be achieved by hydrolyzing individually a hydrolyzable methyltrialkoxysilane and a hydrolyzable phenyltrialkoxysilane, and then combining the resulting organopoly siloxanes to form the initial reaction mixture described above. The resulting resinous mixture ultimately yields, by the method described, a cured, solid, machinable, heat-resistant organopolysiloxane body.

Products of the invention of the —344 application and boron modifications of which can be produced by the instant invention are machinable, heat-resistant bodies comprising or consisting essentially of the siloxane condensation product of methylsilanetriol and phenylsilanetriol, in a molar ratio of from 1:10 to 10:1 (preferably from 1:5 to 5:1), respectively, and into which also may be incorporated, e.g., by cocondensation of the later-named diol with the methylsilanetriol and phenylsilanetriol, from 0 to 10 (preferably from 0 to 5) mole percent of the siloxane condensation product of diphenylsilanediol.

It will be understood, of course, by those skilled in the art that the silanols mentioned in the preceding paragraph, as well as the foregoing and others set forth elsewhere in the specification and in the appended claims, need not be preformed in making the siloxane condensation product. The aforementioned silanols employed therefore include both those which can be preformed (that is, prepared and isolated prior to undergoing a condensation reaction to form an organopolysiloxane) as well as those which are transitory (that is, incapable of being isolated in pure or substantially pure form as such before condensing to form siloxane linkages).

The boron modifier

As stated in the first paragraph of this specification, the boron modifier is a compound of boron which either initially has or is capable of forming B—OH linkages, typical examples of which are $B_2O_3$, boric acids, and hydrolyzable boric esters, especially those embraced by Formula II, viz,

wherein R represents an alkyl radical containing less than 6 carbon atoms. Examples of such boron triesters (trialkoxyborons) are methyl borate, ethyl borate, and propyl through amyl borates (both normal and isomeric forms). If desired, the corresponding mono- and diesters of boron may be used, that is, compounds wherein one or two —OH groups replace one or two —OR groups in the above formula.

The use of boron mono-, di- and triesters containing 6 or more carbon atoms in the ester grouping is not precluded. Examples of such esters are mono-, di- and trihexyl, -heptyl and -phenyl borates. Such esters are, in general, less desirable for use since, for one reason, the by-product alkanol or phenol evolved has a higher boiling point than the boron esters of lower carbon content with attendant disadvantages in its removal.

Any suitable technique may be used in incorporating the boron compound into the organopolysiloxane. In some instances it may be advantageous to admix the boron compound with the silanol(s) and/or precursor(s) of silanol(s) prior to hydrolysis (if a precursor or precursors are employed) and condensation to an organopolysiloxane. Or, the boron compound may be added at any time after hydrolysis and simultaneous condensation have been initiated up to the time or point during precure at which the partly cured organopolysiloxane still contains sufficient residual water and/or alcohol by-product to have a solvent action on the boron compound, thereby permitting ease of admixture and coaction with the incompletely cured or condensed organopolysiloxane. For example, the boron compound may be incorporated into the heat-curable organopolysiloxane while the latter contains at least about 20% e.g., from 30 to 80 or 90%, by weight of the theoretical amount of volatile by-products of the reaction to form the boron-modified organopolysiloxane. Or, the boron compound may be added to the reaction mass just prior to starting to distill off the volatile by-products. The chosen boron compound and its solubility characteristics are taken into consideration when determining the point of its addition into the organopolysiloxane. For example, boric acids are much more soluble in the organopolysiloxane than $B_2O_3$, and hence boric acid may be added later in the condensation reaction than $B_2O_3$.

The amount of boron compound, calculated as boron, incorporated in the organopolysiloxane is sufficient to improve physical properties, such as hardness, of the cured organopolysiloxane, that is, of the organopolysiloxane in its ultimate form or state for service use. Although this amount may vary considerably, the amount of boron component (calculated as boron) in the cured organopolysiloxane generally ranges from about 0.01% to about 6.0%, more particularly from about 0.1 to about 4.0%, by weight thereof. Good results in improving physical properties have been obtained when the boron component, calculated as boron, was present in the organopolysiloxane in an amount within the range of from 0.15% to about 3.0% by weight of the cured organopolysiloxane.

We are unable to state with certainty the nature of the reaction or association that takes place when a boron compound of the kind used in practicing our invention is incorporated into an organopolysiloxane as herein set forth. The available evidence indicates that the boron is chemically combined in the polymer molecule since it is not extracted from the organopolysiloxane by water. That the boron-modified organopolysiloxane contains the boron in chemical combination is evidenced by the fact that no cloudiness of such a resin is observed when the resin is subjected to boiling water for 24 hours. If the resin contained the boron compound in non-chemical combination, e.g., in merely a dispersed state, then cloudiness of the resin would occur when it was subjected to boiling water.

Theoretical considerations also tend to substantiate the belief that the boron is chemically combined in the polymer molecule, presumably as

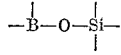

linkages, since theoretically such linkages could form during cohydrolysis and cocondensation of the hydrolyzable boron compound with organosilanol(s) or precursor(s) thereof. However, it is possible that the boron may be present in or associated with the organopolysiloxane molecule in the form of some other chemical complex.

The preferred organopolysiloxanes employed in practicing this invention are those prepared as previously has been described and into which the boron compound has been incorporated by the above-described technique. Further processing of the boron-modified, partly cured (i.e., precured) organopolysiloxane is essentially the same as set forth in our aforementioned copending applications Ser. Nos. 306,344 and 370,684. For instance, modifiers in addition to a boron compound, and which are substantially chemically inert during the further curing conditions employed, can be added to the organopolysiloxane to obtain desired variations in properties. Fillers, e.g., diatomaceous earth and other forms of silica, as well as clays or clay-like materials, e.g., bentonite, etc., fibers, e.g., glass fibers, organic fibers of natural and synthetic origin, etc., can be added. Coloring agents such as alcohol- or water-soluble dyes or insoluble pigments can be incorporated into the boron-modified organopolysiloxane to give compositions or bodies of the kind herein described and which are also colored. The quantity of dye or pigment and the most advantageous point of its addition depend upon such influencing variables as, for instance, the particular coloring agent used and the desired color of the product. These variables are, therefore, best determined by routine test.

Illustrative examples of other effect agents that may be incorporated into the organopolysiloxane are opacifiers, e.g., titanium dioxide, zinc oxide, etc., plasticizers, mold lubricants, heat-stabilizers, inhibitors of various kinds including decomposition inhibitors, natural and synthetic resins, and other modifiers or additives commonly employed in casting, molding, coating and other compositions.

After casting or otherwise shaping in a mold, or after deposition as a coating on a substrate, or other similar or equivalent action, the boron-modified organopolysiloxane resin is cured. Cross-linking and some linear polymerization probably proceed at this stage since the resin becomes increasingly hard.

Taking as an example the production of a cast resin to obtain a hard, machinable, heat-resistant body, the final cure of such a resin can be carried out, if desired, at room or ambient temperature (20°–30° C.) or lower merely by allowing the cast resin to remain undisturbed.

Although the final cure may be effected without added heat, a more convenient procedure involves heating the boron-modified, precured, organopolysiloxane resin at about 90° C. for varying time intervals, e.g., for from about 1 to 3 days, or sometimes longer, for instance up to 7 days. The final stages of cure can also be carried out at temperatures above 100° C. after a cure at 90° C. has brought the resin to a substantially hard condition.

The resinous product of the precure step is soluble in water-miscible organic solvents such as alkanols (e.g., methanol through pentanol), ketones (e.g., acetone, methyl ethyl ketone, etc.), ethers (e.g., glycol monoethyl ether, tetrahydrofuran, etc.), as well as many other common organic solvents. The resulting solutions have prolonged storage life before gelation occurs, and their stability increases with decreasing temperature and resin concentration.

A lower limit for resin concentration is set only by convenience, since storage and subsequent removal of solvent from extremely dilute solutions is generally commercially unfavorable. These dilute solutions, usually containing about 50 weight percent of resin solids, can be evaporated to a more viscous stage and used as molding materials by the further curing steps already described. As previously indicated, they can also be used as film-forming materials, e.g., in coating applications, by spraying, brushing, or other means known to the art. The thickness of the resulting films can be controlled, of course, by varying the concentration of the resin solution and the number of layers applied. The coatings thereby obtained can be cured by heating, e.g., according to the curing process previously described for making a molded resin. These films are useful, for example, as water- and abrasion-resistant coatings.

The above-described techniques for the preparation of solid, organopolysiloxane bodies are, in general, also applicable to the formation of such films. The final, cured products are substantially solid and apparently possess a high degree of cross-linking, since they are substantially insoluble in solvents such as benzene and toluene.

In order that those skilled in the art may better understand how the present invention can be carried into effect, the following examples are given by way of illustration and not by way of limitation. All parts and percentages are by weight unless otherwise stated.

which corresponds to about 0.15 to about 0.60, respectively, of the modifier, calculated as boron, in the cured organopolysiloxane. A blank or control also is run in which no $B_2O_3$ is incorporated into the organopolysiloxane but which is otherwise the same. The general procedure is as follows:

A 500-ml. three-necked flask is equipped with a thermometer, magnetic stirrer and condenser. The condenser is provided with a take-off to allow reflux or distillation. In the thusly-equipped flask is placed 190 ml. (1 mole) of methyltriethoxysilane (MTS), 120 ml. (0.5 mole) of phenyltriethoxysilane (PTS), 81 ml. (4.5 moles) of distilled water (adjusted to varying acidities, in different runs, of 0, 5 and 10 p.p.m. calculated as HCl) and varying amounts of $B_2O_3$ (fused boric acid). The resulting two-phase system is heated with stirring to about 80° C. After heating and stirring for from 5 to about 20 minutes at this temperature a one-phase system is formed. This single-phase reaction mass is heated under reflux with stirring for 4 hours. Two hundred (200) ml. of by-product ethanol, which is about 80% of the theoretical amount, is then distilled off and collected. The residual liquid organopolysiloxane contains about 60% by weight of solids.

The aforementioned residue of liquid organopolysiloxane resin is transferred to a 400-ml. beaker in which it is heated with stirring to effect precure. Usually it is held only momentarily at 140° C. A clear, incompletely condensed resin results.

For each run three castings are usually made by pouring samples into small circular aluminum pans wherein discs are formed when the resin is fully cured. Curing is effected by placing the cast samples in a 90° C. oven until the resin has solidified. The mold is then stripped from the solid resin and it is cured for an additional time up to, for instance, 7 days while angularly positioned so that both the top and the bottom of the casting are exposed to hot air. The cured discs are hard, clear and free from cracks both hot and after cooling to room temperature. The samples (molded discs, 2-inch diameter x ¼ or ½-inch thick) are tested for "thermofailure" (resistance to prolonged thermal exposure), outside hardness, inside or internal hardness, and acetone resistance both after the aforementioned cure for 7 days at 90° C. and, also, after a further cure for 24 hours at 135° C. A more detailed description of the test procedures is given later herein. The results are summarized in Table I. Similar results are obtained when an equivalent amount of a boric acid, specifically $H_2B_4O_7$, is substituted for the amounts of $B_2O_3$ (fused boric acid) employed in this example.

TABLE I

| Run No. | Acid, p.p.m., calculated as HCl | $B_2O_3$ (fused boric acid) | Thermo-failure, ° C. | Acetone resistance (hours to complete failure), cure at— | | Rockwell hardness | | | |
|---|---|---|---|---|---|---|---|---|---|
| | | | | 90° C. | 135° C. | Cured 7 days at 90° C. | | Cured 24 hours at 135° C. after prior 7-day cure at 90° C. | |
| | | | | | | Outside | Inside | Outside | Inside |
| D-109 [1] | 0 | 0 | 280 | 96 | (2) | 135 | 190 | Cracked | Cracked |
| D-110 [1] | .5 | 0 | 160 | 96 | (2) | 142 | 155 | Cracked | Cracked |
| D-111 [1] | 10 | 0 | 160 | 96 | (2) | 142 | 140 | Cracked | Cracked |
| D-118 | 5 | 0.5 | 280 | 72 | 72 | 115 | 148 | 117 | 144 |
| D-119 | 5 | 1.0 | >280 | 48 | 145 | 108 | 135 | 112 | 144 |
| D-120 | 5 | 1.5 | >280 | 24 | 72 | 111 | 145 | 112 | 152 |
| D-121 | 5 | 2.0 | >280 | 24 | 72 | 107 | 134 | 128 | 135 |
| 2029-B | 10 | 0.5 | >280 | 8 | 240 | 123 | 140 | 123 | 151 |
| 2030-B | 10 | 1.0 | 240 | 8 | 144 | 110 | 138 | 114 | 134 |
| 2031-B | 10 | 1.5 | 240 | 6½ | 144 | 114 | 128 | 115 | 131 |
| 2032-B | 10 | 2.0 | >280 | 6½ | 72 | 97 | 118 | 128 | 124 |

[1] Control.
[2] Cracked; could not test.

EXAMPLE 1

A series of runs is made in which $B_2O_3$ (fused boric acid) in varying proportions is incorporated into an organopolysiloxane in the preparation of which the ratio of total monomer to water is maintained at 1:3; the acidity, calculated as HCl, ranges from 0 to 10 p.p.m., and the amount of $B_2O_3$ charged ranges from 0.5 to 2.0 g.,

EXAMPLE 2

A series of runs is made as in Example 1 with the exception that triethyl borate (density=0.864 at 26.5° C.) in varying proportions is incorporated into the organopolysiloxane instead of $B_2O_3$. The amount of triethyl borate charged ranges from 0.5 ml. (0.43 g.) to 10.0 ml. (8.64 g.), which corresponds to from about 0.03 g. (or about 0.02%) to about 0.64 g. (or about 0.49%) of the modifier, calculated as boron, in the cured organopolysiloxane. As in Example 1, the total monomer-to-water ratio is maintained at 1:3. The results are summarized in Table II.

TABLE II

| Run No. | Acid, p.p.m., calculated as HCl | Triethyl borate, ml. | Thermofailure, °C. | Acetone resistance (hours to complete failure), cure at— | | Rockwell hardness | | | |
|---|---|---|---|---|---|---|---|---|---|
| | | | | | | Cured 7 days at 90° C. | | Cured 24 hours at 135° C. after prior 7-day cure at 90° C. | |
| | | | | 90° C. | 135° C. | Outside | Inside | Outside | Inside |
| D-109 [1] | 0 | 0 | 280 | 96 | [2] | 135 | 190 | Cracked | Cracked |
| D-110 [1] | 5 | 0 | 160 | 96 | [2] | 142 | 155 | Cracked | Cracked |
| D-111 [1] | 10 | 0 | 160 | 96 | [2] | 142 | 140 | Cracked | Cracked |
| D-158 | 0 | 0.5 | 280+ | 10 | 46 | 146 | 207 | 127 | F |
| D-159 | 0 | 2.5 | 280 | 10 | 94 | 146 | 176 | 137 | 163 |
| D-160 | 0 | 5.0 | 260 | 10 | 70 | 133 | 159 | 132 | 161 |
| D-161 | 0 | 7.5 | 280+ | 10 | 46 | 116 | 135 | 123 | 140 |
| D-162 | 0 | 10.0 | 280 | 10 | 24 | 107 | 129 | 116 | 139 |
| 2057-B | 5 | 0.5 | 280+ | 10 | 94 | 140 | 176 | 136 | 171 |
| 2058-B | 5 | 2.5 | 280+ | 8 | 24 | 124 | 154 | 120 | 148 |
| 2059-B | 5 | 5.0 | 280+ | 8 | 24 | 119 | — | 126 | 146 |
| 2060-B | 5 | 7.5 | 280+ | 5½ | 24 | 113 | 133 | 120 | 136 |
| 2061-B | 5 | 10.0 | 280+ | 5½ | 24 | 115 | 128 | 116 | 145 |
| 2063-B | 10 | 0.5 | 260 | 8 | 94 | 133 | 162 | 134 | 166 |
| 2064-B | 10 | 2.5 | 260 | 6 | 46 | 121 | 143 | 132 | 157 |
| 2065-B | 10 | 5.0 | 280 | 6 | 24 | 132 | 140 | 144 | F |
| 2066-B | 10 | 7.5 | 280+ | 6½ | 24 | 132 | 131 | | |
| 2067-B | 10 | 10.0 | 280+ | 7 | 24 | 114 | F(133) | | |

[1] Control.
[2] Cracked; could not test.

NOTE.—F=failed.

From the results of the tests described under Examples 1 and 2 and from others that were carried out in which various hydrolyzable oxygen-containing compounds of boron were incorporated into an organopolysiloxane of the kind involved in this invention, the following observations and general conclusions can be made:

(1) As the acid value is increased, the acetone resistance decreases in cast organopolysiloxanes cured for 7 days at 90° C. This same trend, although less pronounced, is found when the boron is introduced initially in the form of an alkyl borate, specifically ethyl borate (i.e., triethyl borate).

(2) An additional cure for 24 hours at 135° C., following a cure for 7 days at 90° C., definitely increases the acetone resistance of cast organopolysiloxanes containing boron introduced initially in the form of $B_2O_3$.

(3) The thermal stability seems to be about the same regardless of the form in which the boron compound is initially added, with somewhat higher values prevailing in some cases when the boron compound employed is triethyl borate as compared with boron oxide.

(4) The more boron introduced into the organopolysiloxane (initially as $B_2O_3$ or triethyl borate, for example), the harder is the inside and the outside of the cast resin after curing for 7 days at 90° C. If the cast resin is given an additional cure for 24 hours at 135° C., the outside hardness remains about the same but the inside hardness increases.

(5) The thermal stability tends to decrease with a decrease in the amount of water included in the charge in all cases involving the use of $B_2O_3$ as the boron-containing modifier of the organopolysiloxane.

(6) Acetone resistance decreases with a decrease in the water content of the charge in all tested samples that had been cured 7 days at 90° C.

(7) Reactions run at an initial acidity of 5 p.p.m., calculated as HCl, seem to provide the best acetone resistance. If the boron content is increased in carrying out reactions run at this initial acidity, the acetone resistance decreases.

(8) An increase in the boron content of the cast organopolysiloxane (introduced initially as, for example, boron oxide or triethyl borate), results in an increase in the hardness of the cured organopolysiloxane. In general, however, such an increase in boron content tends to increase the thermal stability but to decrease the acetone resistance.

Test methods

The tests for thermofailure, acetone resistance and hardness referred to in Tables I and II are carried out as follows:

Resistance to prolonged thermal exposure.—This property, also known as thermal resistance or as thermofailure, determines the length of time a material will withstand a particular temperature (e.g., 250° C. or higher). The property is important because many non-stabilized materials (especially those which are wholly or partly organic) become discolored, may craze or even crack if maintained at an elevated temperature for a period of time.

The main apparatus or facilities employed are an electric muffle furnace or oven capable of raising the temperature gradually (e.g., at about 50° C. per hour) to the desired maximum; and a strong light source for observing the specimens while they are in the oven. Two test specimens, which are one-fourth sections of the aforementioned 2-inch diameter discs, and a control, are placed in the oven, and the temperature is raised at about 50°–60° C. per hour. Temperatures are checked with a thermometer as well as with the oven controller. The specimens are observed every hour for the first 4 hours until discoloration or cracking occurs. The yellow color that normally develops at the elevated temperature is always compared with the control. The test is normally discontinued after 24 hours. Cracking is taken as evidence of thermofailure, and the temperature at which this occurs is recorded.

Acetone resistance (ASTM–D–543).—Acetone resistance of cast organopolysiloxanes is characterized by cracking in acetone. For this test, electronic grade of acetone is used, and a beaker 250 ml. or larger in size. The test specimens (two are used per test) are the above-mentioned discs (2-inch diameter x ¼-inch thick). The two specimens are placed in a beaker containing 100 ml. acetone at room temperature, and thereafter they are observed regularly for cracking. The time for cracking may range, for example, from one hour to several days. The number of days or hours until cracking occurs is recorded. For prolonged test periods, a cover should be placed over the beaker to prevent or minimize the evaporation of acetone.

Rockwell hardness.—This test involves the dead-weight loading of a steel ball on the surface of the test material. The depth of penetration of the ball is an indication of the hardness of the material (but not its abrasion resistance); hence the lower the recorded values, the harder is the material undergoing the test. The apparatus is a Rockwell hardness tester described in ASTM-D-785. Molded discs, 2-inch diameter x ½ inch thick, are employed for this test. A strip, ½ inch x ½ inch x 2 inches is cut from the center of the disc for use in measuring the hardness of the internal and molded surface material.

The testing method employed is in accordance with Procedure B of ASTM-D-785. Two measurements are made on one molded surface, after which the sample is turned over, and two measurements are taken on the opposite molded surface. Two measurements are taken on only one face of the internal section. Thus, a total of six measurements are made per specimen. The hardness determined by this procedure is known as the alpha-Rockwell hardness. The values reported in the tables are the averages of the recorded readings of the specimens tested from the individual runs.

EXAMPLE 3

Example 1 is repeated with the exception that 2.5 g. $B_2O_3$ is used instead of the maximum amount of 2.0 g. $B_2O_3$ that was used in that example. Similar results are obtained.

EXAMPLE 4

This example illustrates the preparation of a boron-modified, solely methylpolysiloxane instead of boron-modified (methyl)(phenyl)polysiloxanes as in Examples 1–3.

The apparatus used is the same as in Example 1 with the exception that a 250 ml. flask is employed. The charge to the reaction flask consists of 142 ml. (¾ mole) MTS, 42 ml. (2.25 moles) $H_2O$ and 0.5 g. $B_2O_3$. This amount of $B_2O_3$ in this size of charge provides about 0.15% of boron component, calculated as boron, in a cured, boron-modified methylpolysiloxane.

The mixture of MTS, water and $B_2O_3$ is heated and stirred, the temperature being raised from room temperature to 80° C. in 9 minutes. Two phases form initially, and these phases clear to one phase after heating under reflux for 3 hours and 10 minutes. Heating under reflux is continued for an additional 45 minutes. One hundred (100) ml. ethanol is then removed without any indication of clouding or separation of the resin which still contains some residual ethanol.

The liquid, boron-modified organopolysiloxane residue is precured by heating with stirring in an open beaker to 130° C. A sample is poured in a small aluminum pan as described in Example 1, and placed in a 90° C. oven for 24 hours. A hard, solid, cured resin is obtained.

EXAMPLE 5

This example differs from Example 4 in that the charge contains 5.0 g. of $B_2O_3$ instead of 0.5 g. as in Example 4. This higher amount of $B_2O_3$ provides about 1.5% of boron component, calculated as boron, in the cured organopolysiloxane. When heating is started the water layer is extremely "milky" due to the undissolved $B_2O_3$. The temperature of the reaction mass is increased from room temperature to 80° C. pot temperature in 10 minutes, yielding two phases of which the water layer is clear. After heating and stirring under reflux for an additional 15 minutes the two phases clear to one phase. The reaction is continued under these conditions for 3 hours and 45 minutes after the formation of the clear, single phase. At the end of this period distillation for the removal of by-product ethanol is started, and a total of 70 ml. $C_2H_5OH$ is collected.

The thick, viscous, liquid organopolysilioxane is precured by heating to 150° C., at which point a sample is cast and further cured for 7 days in a 90° C. oven as described in Example 1. A hard, solid, cured resin is obtained.

EXAMPLE 6

Example 4 is repeated with the exception that instead of ¾ mole methyltriethoxysilane there is used, in individual runs, ¾ mole of the following alkoxysilanes:

(a) Methyltri-n-propoxysilane
(b) n-Propyltriethoxysilane

Similar results are obtained.

EXAMPLE 7

A portion of Example 2 is repeated (wherein the acidity of the reaction mass is 5 p.p.m. calculated as HCl), using the following reactant charges instead of 1 mole of methyltriethoxysilane and ½ mole of phenyltriethoxysilane:

(a) { 1 mole methyltriethoxysilane
      ½ mole cyclohexyltriethoxysilane
(b) { 1 mole ethyltripropoxysilane
      ½ mole n-hexyltripropoxysilane
(c) { 1 mole methyltriethoxysilane
      ½ mole amyltriethoxysilane Similar results are obtained.

As will be apparent to those skilled in the art modifications of the present invention can be made or followed in the light of the foregoing disclosure without departing from the spirit and scope of the disclosure or from the scope of the claims. Thus, instead of using a compound of boron that contains, or is capable of forming, B—OH linkages one may use compounds of other elements such as metals and metalloids that have or are capable of forming a linkage with —OH and the particular element. Examples of such elements, to mention a few, are V, Ti, Zr, Be, Al and Zn.

What is claimed is:

1. The method of preparing a boron-modified organopolysiloxane which comprises:
    (I) preparing an organopolysiloxane by the steps of:
        (A) heating a mixture of:
            (1) hydrolyzable alkoxysilane material selected from the group consisting of:
                (a) a methyltrialkoxysilane having the general formula $CH_3Si(OR)_3$ wherein R in each —OR grouping represents an alkyl radical having less than five carbon atoms, and
                (b) a mixture of a methyltrialkoxysilane as defined in (a) and a phenyltrialkoxysilane having the general formula $C_6H_5Si(OR)_3$ wherein R in each —OR grouping also represents an alkyl radical having less than five carbon atoms, the ratio of the moles of methyltrialkoxysilane and phenyltrialkoxysilane being from 1:10 to 10:1, the alkoxysilane material of (a) and of (b) individually optionally including from 0 to 10 mole percent, based on total silane reactant material, of at least one compound different from the aforementioned methyltrialkoxysilane and phenyltrialkoxysilane and which is represented by the general formula

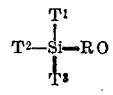

wherein $T^1$, $T^2$ and $T^3$ represent monovalent hydrocarbon radicals independently selected from the group consisting of aryl, alkyl and alkenyl radicals, each of which contains less than seven carbon atoms, and the alkoxy radical, —OR, wherein R in each —OR grouping represents an alkyl radical having less than five carbon atoms, and (2) from 1.5 to 10 moles of water per mole of total silane reactant material, said mixture containing less than 0.01 mole of acid per mole of total silane reactant material, and the heating of the said mixture to form a liquid siloxane partial condensation product being for from 1 to 10 hours at a temperature of at least 50° C. while retaining therein at least 1.5 moles of alkanol by-products in said mixture per mole of silane starting material assuming complete hydrolysis of all alkoxy-silicon linkages in silane reactant material in the said mixture;

(B) concentrating the liquid siloxane partial condensation product from step A by volatilizing therefrom between 50 and 90 mole percent of the total by-product alkanol contained therein, as well as some water, thereby to obtain a liquid residue of siloxane partial condensation product; and (C) precuring the concentrated liquid siloxane partial condensation product from step B by heating it at a temperature within the range of from 100° C. to 300° C. for a period short of gel formation thereby to remove most of the remainder of the volatile material from the said siloxane partial condensation product and to obtain a more highly condensed, further curable, siloxane partial condensation product that is adapted to be converted to a solid, thermoset, organopolysiloxane resin; and (II) modifying the organopolysiloxane prepared as described under I by incorporating therein, during any of steps A, B, C, of main step I, a compound of boron having or capable of forming B—OH linkages and which is an oxide, acid or hydrolyzable ester of boron in an amount, calculated as boron, such that it is present in the ultimate siloxane condensation product within the range of from about 0.01% to about 6.0% by weight thereof.

2. The method as in claim 1 wherein the compound of boron is incorporated into the organopolysiloxane while the latter contains at least about 20% by weight of the theoretical amount of volatile by-products of the reaction.

3. The method as in claim 1 wherein the boron compound is $B_2O_3$.

4. The method as in claim 1 wherein the boron compound is a boric acid.

5. The method as in claim 1 wherein the boron compound is a hydrolyzable boric ester.

6. The method as in claim 5 wherein the hydrolyzable boric ester is one represented by the general formula

wherein R represents an alkyl radical containing less than six carbon atoms.

7. The method as in claim 1 wherein the hydrolyzable alkoxysilane material of (1) is a methyltrialkoxysilane having the general formula $CH_3Si(OR)_3$ wherein R in each —OR grouping represents an alkyl radical having less than five carbon atoms; the mixture of A which is heated contains from 1.5 to 5 moles of water per mole of total silane reactant material; and the amount of boron compound employed in step II is such that it is present in the ultimate siloxane condensation product within the range of from about 0.1% to about 4.0% by weight thereof.

8. The method as in claim 7 wherein the methyltrialkoxysilane is methyltriethoxysilane; the boron compound employed in step II is $B_2O_3$ in an amount such that it is present in the ultimate siloxane condensation product within the range of from about 0.15% to about 1.5% by weight thereof; and it is incorporated into the organopolysiloxane by adding it to the initial mixture of methyltriethoxysilane and water that is heated as described under A of step I.

9. The method as in claim 1 wherein the hydrolyzable alkoxysilane material of (1) is a mixture of a methyltrialkoxysilane having the general formula $CH_3Si(OR)_3$ and phenyltrialkoxysilane having the general formula $C_6H_5Si(OR)_3$ wherein R in each —OR grouping of the said alkoxysilanes represents an alkyl radical having less than five carbon atoms, the ratio of the moles of methyltrialkoxysilane and phenyltrialkoxysilane being from 1:5 to 5:1; the mixture of A which is heated contains from 1.5 to 5 moles of water per mole of total silane reactant material; and the amount of boron compound employed in step II is such that it is present in the ultimate siloxane condensation product within the range of from about 0.1% to about 4.0% by weight thereof.

10. The method as in claim 9 wherein the methyltrialkoxysilane is methyltriethoxysilane; the phenyltrialkoxysilane is phenyltriethoxysilane; the boron compound employed in step II is $B_2O_3$ in an amount such that it is present in the ultimate condensation product within the range of from about 0.15% to about 3.0% by weight thereof; and it is incorporated into the organopolysiloxane by adding it to the initial mixture of methyltriethoxysilane, phenyltriethoxysilane and water that is heated as described under A of step I.

11. The method as in claim 9 wherein the boron compound employed in step II is triethyl borate.

12. The method as in claim 1 wherein the mixture of A which is heated contains from 1.5 to 3 moles of water per mole of total silane reactant material.

13. The precured, boron-modified, siloxane partial condensation product resulting from the method of claim 1.

14. The method as in claim 1 which includes the further step of finally curing the boron-modified, further curable, siloxane partial condensation product of C by subjecting it to a temperature-time period corresponding to a temperature of from ambient temperature to 135° C. for a period of time ranging from one to eight days thereby to convert the precured, boron-modified, siloxane partial condensation product to a thermoset, boron-modified organopolysiloxane.

15. The thermoset, boron-modified organopolysiloxane resulting from the method of claim 14.

References Cited

UNITED STATES PATENTS 3,213,048   10/1965   Boot _____ 260—46.5
3,257,330   6/1966   Burzynski, et al. _____ 260—37

DONALD E. CZAJA, *Primary Examiner.*

M. I. MARQUIS, *Assistant Examiner.*

U.S. Cl. X.R.

260—037